United States Patent Office 2,890,062
Patented June 9, 1959

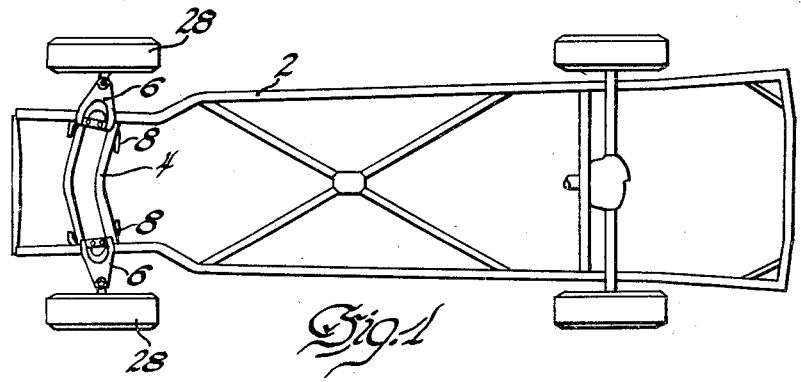
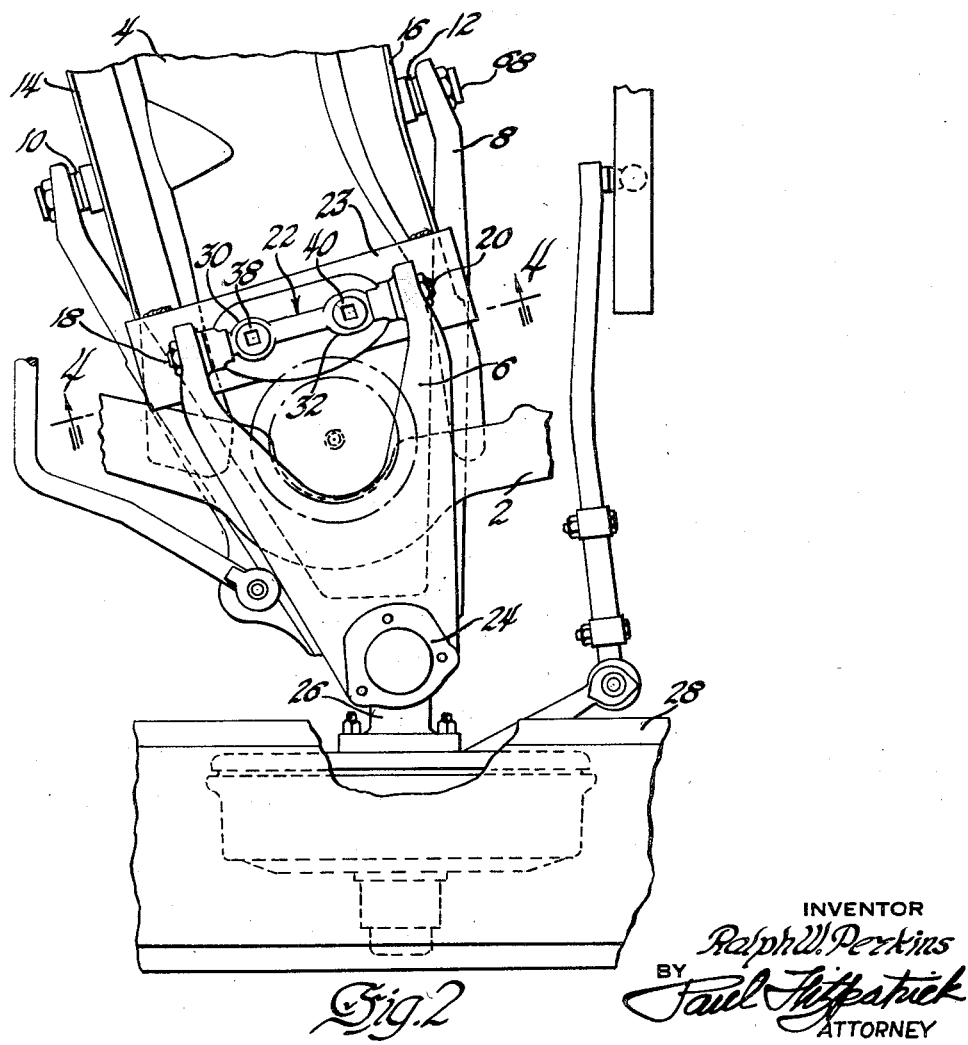
INVENTOR
Ralph W. Perkins
BY Paul Fitzpatrick
ATTORNEY

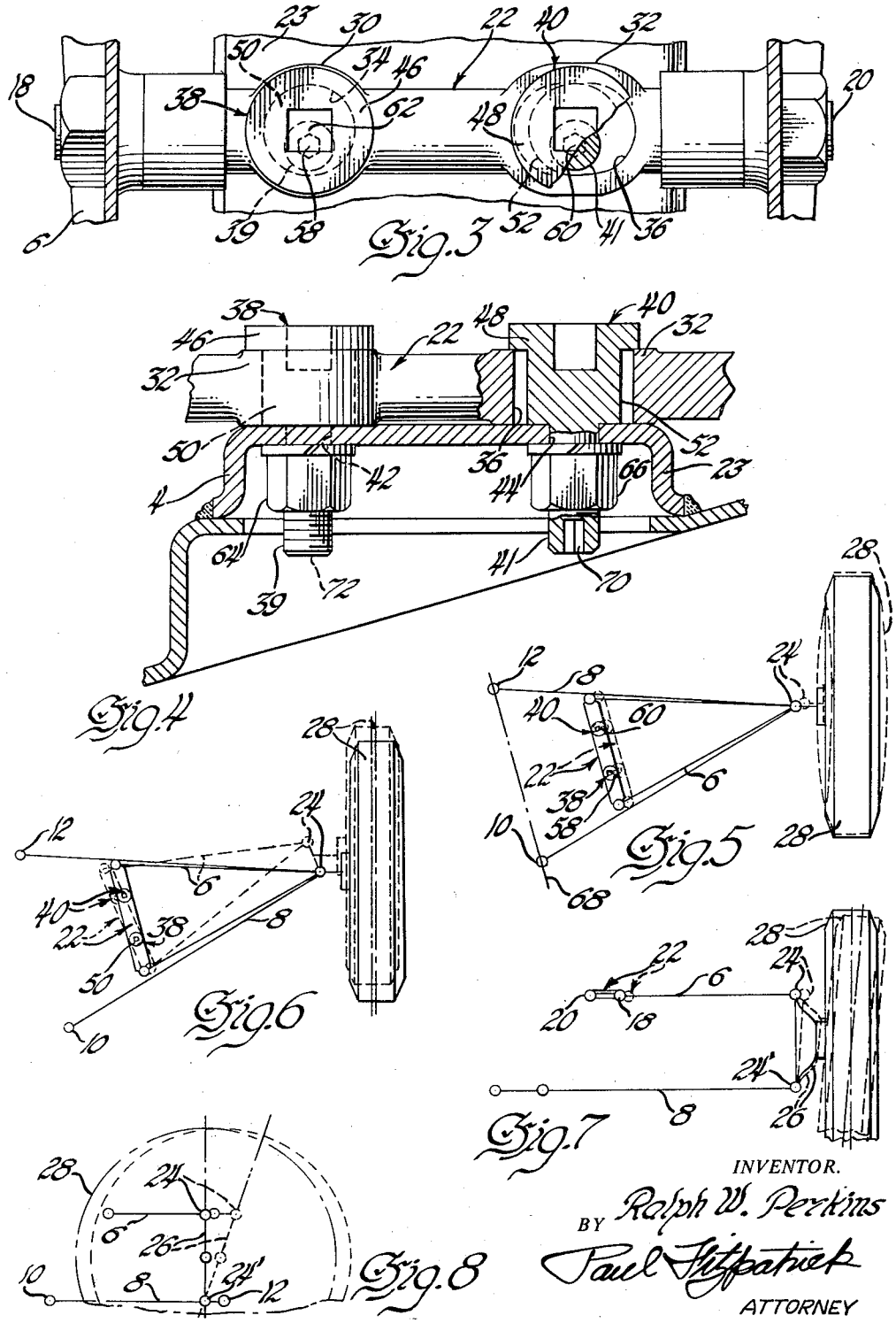

2,890,062

INDEPENDENT WHEEL SUSPENSION WITH CASTER AND CAMBER ADJUSTMENT MEANS

Ralph W. Perkins, Lansing, Mich., assignor to General Motors Corporation, Detroit, Mich., a corporation of Delaware Application December 5, 1955, Serial No. 551,070

5 Claims. (Cl. 280—96.2)

This invention relates to independent wheel suspension for vehicles and more particularly to caster and camber adjusting mechanism for independent wheel suspension.

An object of the present invention is to provide an improved independent wheel suspension for vehicles.

Another object is to provide independent wheel suspension for vehicles including improved caster and camber adjusting means.

A further object is to provide an independent wheel suspension of the type including transversely extending vertically spaced wishbone arms wherein one or both of the arms are swingable about a pivot shaft rigidly connected to the vehicle frame, the pivot shaft being adjustable bodily and angularly relative to the frame to accomplish initial setting and adjustment of wheel caster and camber.

Still another object is to provide a structure of the stated character wherein the pivot shaft is provided with spaced apertures adapted to receive a pair of attaching bolts having eccentric portions, the eccentric portions being effective when the bolts are simultaneously rotated to shift the pivot shaft bodily inwardly and outwardly relative to the frame to vary wheel camber, the said pivot shaft being angularly movable about one of said eccentric portions upon independent rotation of the other of said bolts to vary the wheel caster angle.

Yet a further object is to provide a device of the type described which is readily accessible for adjustment without removing the vehicle wheel.

Yet another object is to provide a device of the stated character which is simple in construction, low in cost, efficient in operation and capable of providing a wide range of adjustment both with respect to caster and camber.

These and other objects, advantages and features of the invention will become more fully apparent as reference is had to the accompanying specification and drawings wherein:

Fig. 1 is a skeleton plan view of a vehicle chassis having a front wheel suspension embodying the present invention.

Fig. 2 is an enlarged fragmentary plan view of the left hand front wheel suspension, showing the details of construction thereof in relation to the present invention.

Fig. 3 is an enlarged fragmentary plan view of a control arm pivot shaft according to the invention.

Fig. 4 is a sectional side elevational view looking in the direction of arrows 4—4 of Fig. 2.

Fig. 5 is a diagrammatic plan view illustrating the geometry of motion, resulting from one form of operation of the invention.

Fig. 6 is a view similar to Fig. 5 illustrating the geometry of motion resulting from another form of operation of the invention.

Fig. 7 is a diagrammatic front elevational view corresponding to the plan view of Fig. 5; and Fig. 8 is a diagrammatic side elevational view corresponding to the plan view of Fig. 6.

Referring now to the drawings and particularly Fig. 1, there is illustrated a vehicle chassis in which the reference numeral 2 designates generally the vehicle frame. At its forward end, frame 2 is provided with a frame cross member 4 to which are pivotally attached conventional upper and lower wishbone suspension arms 6 and 8. As seen in Fig. 2, lower wishbone arm 8 is pivoted on a generally longitudinal axis defined by pivot studs 10 and 12 which are fixedly connected respectively to the forward and rearward edges 14 and 16 of cross member 4. Upper wishbone arm 6, in turn, is pivotally connected to the opposite ends 18 and 20 of a one piece pivot shaft 22. Shaft 22 is connected, in a manner shortly to be described, to a plate 23 on the upper surface of cross member 4. At its outer end, wishbone arm 6 is provided with a ball joint assembly 24 which is, in turn, connected to the upper end of a generally vertically extending wheel supporting member 26. It will be understood that the outer end of lower suspension wishbone arm 8 is also provided with a ball joint assembly similar to assembly 24 which, in turn, is connected to the lower end of wheel supporting member 26. Accordingly, wheel 28 is steerable about a generally vertical axis passing through the respective ball joint assemblies of upper and lower wishbone arms 6 and 8.

In order to provide for initial setting or subsequent adjustment of wheel caster and camber in accordance with the present invention, pivot shaft 22 is connected to plate 23 of cross member 4 in a manner permitting positive and accurate displacement thereof through a limited degree of horizontal angular movement and through a limited range of lateral horizontal bodily movement. As seen in Figs. 3 and 4, the midportion of pivot shaft 22 is formed with longitudinally spaced enlarged portions 30 and 32 which, respectively, are provided with vertically directed apertures 34 and 36. Aperture 34 is circular in configuration, while aperture 36 is slightly elongated longitudinally. Extending through apertures 34 and 36 are a pair of attaching bolts 38 and 40 having threaded lower end portions 39 and 41, which are received in apertures 42 and 44 formed in plate 23. Attaching bolts 38 and 40 are provided with flat circular head portions 46 and 48, the diameters of which are greater than the major diameter of apertures 34 and 36. Axially adjacent heads 46 and 48, attaching bolts 38 and 40 are reduced in diameter to form eccentric portions 50 and 52 which occupy apertures 34 and 36 of pivot shaft 22. Each portion 50 and 52 is circular in configuration but offset from the principal axes 58 and 60 defined by threaded lower end portions 39 and 41. Consequently, when bolts 38 and 40 are rotated simultaneously about their respective axes 58 and 60 (Fig. 3), eccentric portions 50 and 52 cause lateral bodily shifting movement of pivot shaft 22. However, when bolt 38 is held against rotation, independent rotation of bolt 40 causes pivot shaft 22 to swing in a horizontal arc generated from the center 62 of eccentric portion 50. It will, therefore, be seen that simultaneous rotation of bolts 38 and 40 in the same direction will cause a parallel shifting of pivot shaft 22, while rotation of bolt 40 only imparts limited arcuate movement in either direction from a predetermined angular alignment. In order to permit independent rotation of bolt 40, aperture 36 is slightly elongated, as previously mentioned, to provide clearance for eccentric portion 52 when it occupies the maximum offset position both forwardly and rearwardly from the axis 60 of bolt 40. When pivot shaft 22 has been aligned in a desired position, nuts 64 and 66 are drawn up to lock both bolts 38 and 40 against rotation as well as to firmly clamp pivot shaft 22 against plate 23 of cross member 4.

Figs. 5, 6, 7 and 8 illustrate diagrammatically the manner of accomplishing both caster and camber adjustment by means of the present invention. As seen in Figs. 5 and 7, when bolts 38 and 40 are rotated simultaneously clockwise about their principal axes 58 and 60, pivot shaft 22 is caused to move from the position shown in solid lines to the position shown in dotted lines. Since the inner pivot axis 68 defined by lower control arm pivot shafts 10 and 12 remains fixed with respect to cross member 4, wheel 28 is caused to incline outwardly and upwardly to the position shown in dotted lines, thereby changing wheel camber. It will, of course, be understood that the range of adjustment illustrated diagrammatically and the attendant wheel camber effected is for illustrative purposes only. In practice, the desired degree of wheel camber in any given suspension will be determined by the specific design characteristics of the suspension. The pivot shaft will then be located to provide a reasonable range of adjustment in both directions from the desired camber angle.

As seen in Figs. 6 and 8, when bolt 40 is rotated in a counterclockwise direction while bolt 38 remains stationary, pivot shaft 22 swings angularly inwardly about the axis defined by eccentric portion 50 of bolt 38, causing the outer end of upper wishbone arm 6 to move rearwardly in a horizontal arc. Since the outer end of lower wishbone arm 8 remains stationary, rearward swinging movement of upper wishbone arm 6 causes wheel support member 26 to incline rearwardly and upwardly thereby changing the caster angle of wheel support 26 from the position shown in solid lines (Fig. 8) to the position shown in dotted lines. Since wheel support member 26 is connected to arms 6 and 8 by ball joints 24 and 24', inclination of support 26 does not cause interference with normal vertical swinging movement of arms 6 and 8.

In order to permit periodic field adjustment of a suspension embodying the invention, the lower ends of attaching bolts 38 and 40 are provided with Allen socket portions 70 and 72. Hence, nuts 64 and 66 may be loosened from beneath the vehicle and suitable rotary adjustment of bolts 38 and 40 effected with an Allen wrench. After adjustment, nuts 64 and 66 are again tightened to rigidly secure the suspension arms in the newly adjusted position.

From the foregoing, it will be seen that there has been provided an independent wheel suspension in which caster and camber adjustment is not only exceedingly simple, but also unusually wide in range. In addition, the structure affords substantial saving in cost, compared with devices heretofore available, while affording optimum accuracy and exceptional ease of operation.

While but one embodiment of the invention has been shown and described, it will be apparent that numerous changes and modifications may be made therein. It is, therefore, to be understood that it is not intended to limit the invention to the embodiment shown, but only by the scope of the claims which follow.

I claim:

1. A wheel suspension comprising a frame, a wheel supporting member, a pair of transversely extending upper and lower control arms, means universally pivotally connecting said supporting member to the outer ends of said arms, and means pivotally connecting the inner ends of said arms to said vehicle for movement about generally parallel horizontal axes, said last mentioned means including a one piece pivot shaft having spaced openings therein, and means extending through said openings to connect said shaft to said frame, said last mentioned means being selectively rotatable to shift said shaft both bodily and angularly relative to said frame to control wheel camber and caster.

2. An independent wheel suspension comprising a frame, a wheel supporting member, a pair of transversely extending upper and lower control arms, means universally pivotally connecting said supporting member to the outer ends of said arms, means pivotally connecting the inner ends of each of said arms to said vehicle for movement about vertically spaced substantially horizontal axes, said last mentioned means including spaced aligned pivots fixed relative to said frame and a double ended pivot shaft movable relative to said frame, means extending through said shaft and connecting the same to said frame, and eccentric means on said last mentioned means effective to displace said shaft either bodily or angularly in a horizontal plane to cause one end of said supporting member to shift either transversely or longitudinally relative to the other end.

3. An independent wheel suspension comprising a frame, a wheel supporting member, a pair of transversely extending upper and lower control arms having forked inner ends, means universally pivotally connecting said supporting member to the outer ends of said arms, means pivotally connecting the forked inner ends of said arms to said vehicle for movement about generally vertically spaced horizontal longitudinal axes, said last mentioned means including a pivot shaft having spaced openings formed therein, a pair of bolts extending through said openings for connecting said shaft to said frame, said bolts including eccentric portions coacting with said openings, whereby upon rotation of said bolts said shaft may be selectively displaced horizontally either bodily or angularly, and threaded means engaging said bolts to retain said shaft in the selected position.

4. An independent wheel suspension comprising a frame, a wheel supporting member, a pair of transversely extending upper and lower control arms, means pivotally connecting said supporting member to the outer ends of said arms, fixed pivots connecting the inner ends of one of said arms to said vehicle for movement about a generally horizontal axis, movable pivot means connecting the inner ends of the other of said arms to said vehicle for movement about an axis generally parallel with said horizontal axis, said last mentioned means comprising a pivot shaft having spaced openings formed therein, a pair of bolts extending through said openings and connecting said shaft to said frame, eccentric portions formed on said bolts and coacting with said openings upon rotation of said bolts to displace said shaft relative to said frame, said shaft being displaced bodily relative to said frame upon simultaneous rotation of said bolts and displaced angularly relative to said frame upon rotation of one of said bolts.

5. The structure defined in claim 4 wherein one of said openings is circular in configuration and the other of said openings is elongated to accommodate independent rotation of one of said bolts.

References Cited in the file of this patent

UNITED STATES PATENTS

| | | |
|---|---|---|
| 2,154,569 | Hicks | Apr. 18, 1939 |
| 2,216,208 | Michon | Oct. 1, 1940 |
| 2,226,406 | Krotz | Dec. 24, 1940 |
| 2,255,088 | Schroeter | Sept. 9, 1941 |
| 2,339,533 | Wahlberg et al. | Jan. 18, 1944 |
| 2,344,896 | Phelps | Mar. 21, 1944 |
| 2,502,744 | Parker | Apr. 4, 1950 |
| 2,630,330 | Long | Mar. 3, 1953 |

FOREIGN PATENTS

| | | |
|---|---|---|
| 603,199 | Great Britain | June 10, 1948 |